US007733317B2

(12) United States Patent
Murai et al.

(10) Patent No.: US 7,733,317 B2
(45) Date of Patent: Jun. 8, 2010

(54) IMAGE DISPLAY APPARATUS AND ALTERNATIVE CURRENT DRIVE METHOD

(75) Inventors: Toshiharu Murai, Kanagawa (JP); Kazuhiro Fujita, Tokyo (JP); Kenji Kameyama, Kanagawa (JP); Toshiaki Tokita, Kanagawa (JP); Yasuyuki Takiguchi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1031 days.

(21) Appl. No.: 11/043,259

(22) Filed: Jan. 27, 2005

(65) Prior Publication Data

US 2005/0168455 A1   Aug. 4, 2005

(30) Foreign Application Priority Data

Feb. 2, 2004   (JP) .............................. 2004-025175

(51) Int. Cl.
*G09G 3/36* (2006.01)
(52) U.S. Cl. .......................................... 345/94; 345/84
(58) Field of Classification Search ........... 345/87–104, 345/204, 690, 38, 50, 84
See application file for complete search history.

(56) References Cited

U.S. PATENT DOCUMENTS

| 6,597,331 | B1 * | 7/2003 | Kim .............................. 345/60 |
| 6,952,194 | B1 * | 10/2005 | Yamazaki et al. ............. 345/92 |
| 7,050,035 | B2 * | 5/2006 | Iisaka .......................... 345/99 |
| 7,123,332 | B2 * | 10/2006 | Yamazaki et al. ............ 349/149 |
| 2003/0025656 | A1 * | 2/2003 | Kimura ........................ 345/82 |
| 2003/0090448 | A1 * | 5/2003 | Tsumura et al. ............... 345/87 |
| 2004/0150600 | A1 * | 8/2004 | Kojima et al. ................ 345/96 |

FOREIGN PATENT DOCUMENTS

| JP | 6-27902 | 2/1994 |
| JP | 6-38149 | 2/1994 |
| JP | 7-175443 | 7/1995 |
| JP | 09-190162 | 7/1997 |
| JP | 10-031456 | 2/1998 |
| JP | 11-281951 | 10/1999 |
| JP | 2002-006791 | 1/2002 |
| JP | 2003-90992 | 3/2003 |
| JP | 2004-29477 | 1/2004 |

* cited by examiner

*Primary Examiner*—Jimmy H Nguyen
(74) *Attorney, Agent, or Firm*—Oblon, Spivak, McClelland, Maier & Neustadt, L.L.P.

(57) ABSTRACT

A reliable image display apparatus is provided that is capable of preventing a direct current from being applied to liquid crystal of a spatial light modulating element so that damage such as burns in the liquid crystal and screen flicker may be prevented and a high resolution image with high image quality may be displayed. The image display apparatus is configured to divide a frame into 2i sub frames (i corresponding to a natural number) and sequentially display the sub frames using the liquid crystal spatial light modulating element. The image display apparatus includes a polarity switching unit configured to reverse the polarity of a drive voltage for a pixel of the spatial light modulating element for every j sub frame(s) (j corresponding to a natural number that is less than 2i) and for every n frame(s)(n corresponding to a natural number).

1 Claim, 10 Drawing Sheets

IMAGE DISPLAY APPARATUS AND ALTERNATIVE CURRENT DRIVE METHOD

BACKGROUND OF THE INVENTION

1. Field of the Invention

The present invention relates to an image display apparatus that includes a liquid crystal spatial light modulating element and is configured to conduct time division display of a frame by dividing the frame into plural sub frames. The present invention also relates to a method of driving a spatial light modulating element with an alternative current.

2. Description of the Related Art

In recent years and continuing, with the dramatic increase in computer processing capabilities, technology for displaying a higher resolution image in a computer is developing and in turn, high resolution capabilities are being demanded in an image display apparatus. However, in apparatuses such as a projector, the resolution of a spatial light modulating element for displaying an image may not be able to keep up with the increasing resolution of the image to be displayed. Accordingly, various techniques are proposed for achieving a higher resolution image in such apparatuses. For example, in Japanese Laid-Open Patent Publication No.2003-90992, a configuration of a projector including an optical deflecting element is disclosed.

Figure 1:
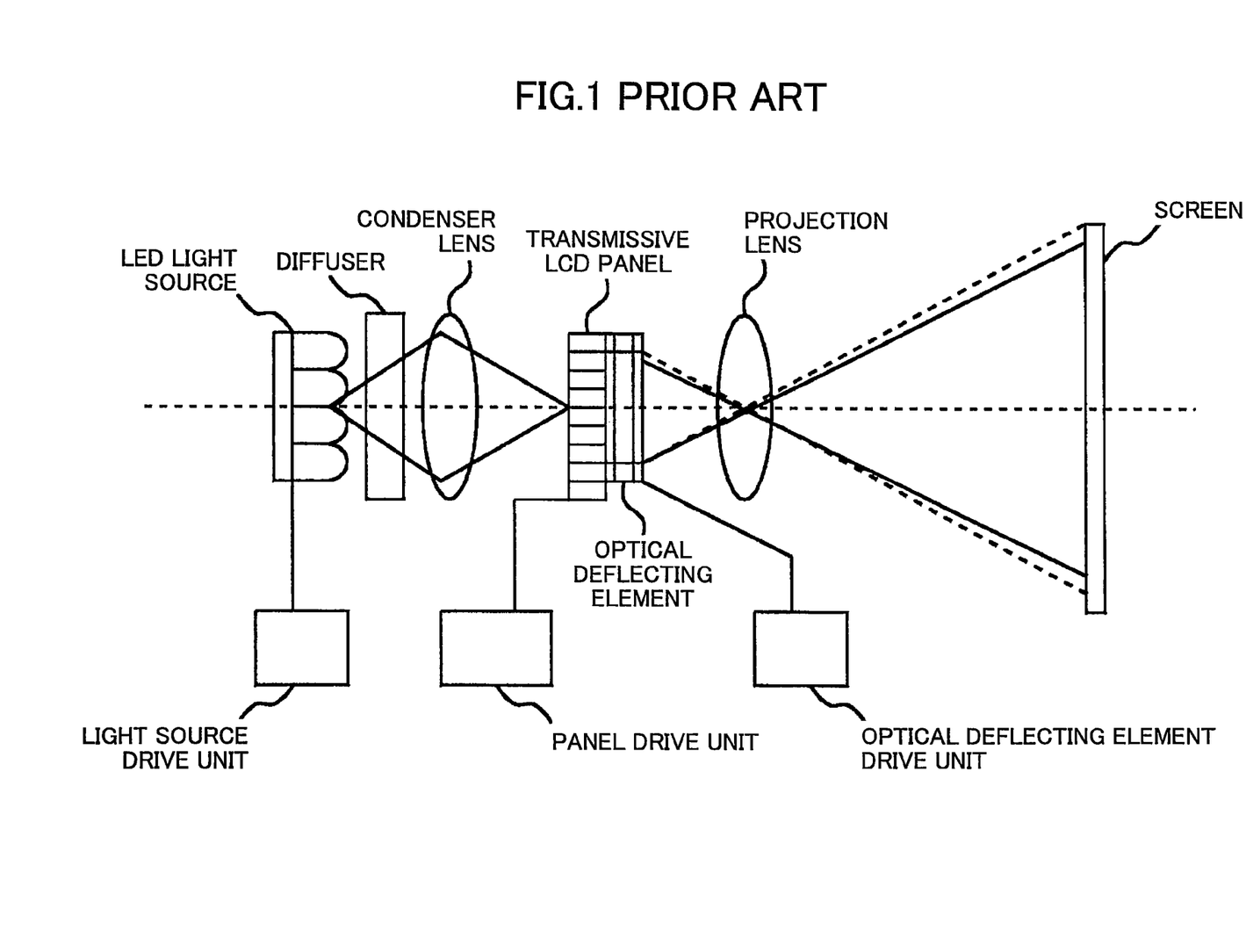
FIG. 1 is a diagram showing a configuration of a projector according to the prior art.

FIG. 1 shows a configuration of a projector according to the disclosure of Japanese Laid-Open Patent Publication No.2003-90992. The projector illustrated in this drawing includes an LED light source that is formed by a two-dimensional array of LED lamps and is arranged to emit light towards a screen, a diffuser positioned in the light emitting direction with respect to the light source, a condenser lens, a spatial light modulating element in the form of a transmissive LCD panel, and a projection lens. Further, the projector includes an optical deflecting element that is arranged at the light path between the transmissive LCD panel and the projection lens.

In this projector, illuminating light that is emitted from the LED light source is equalized at the diffuser, and is controlled and synchronized with an illuminating light source by the condenser using an LCD panel drive part to realize critical illumination of the illuminating light onto the transmissive LCD panel. Then, the illuminating light is spatially modulated by the transmissive LCD panel and is incident onto the optical deflecting element as image light. The image light is then shifted by a given distance in the positioning direction of pixels.

Also, in this projector a panel drive part is arranged to divide an image of one frame into plural sub frames so that the sub frames may be sequentially displayed through time divisional display at the transmissive LCD panel. In turn, the optical deflecting element deflects the light path in synch with the display of each sub frame so that the display positions of the sub frames may be shifted with respect to each other. In this way, it may appear as though the number of pixels displayed is multiplied.

The optical deflecting element may correspond to a device for deflecting the light path of incident light and may be realized by forming a lateral directional electrical field on a chiral smectic C liquid crystal layer. According to this example, an average inclination of the optical axis of the chiral smectic C liquid crystal layer, which generates its own polarity, is used to change the electrical field direction to enable high speed light path deflection.

When liquid crystal is used to realize the spatial light modulating element, an alternating current needs to be applied as the drive current for the spatial light modulating element as is known among persons skilled in the art. When a direct current is used as the drive current, the liquid crystal may be susceptible to damage such as burns. Accordingly, in a display apparatus such as a projector including an optical deflecting element that divides an image of one frame into plural sub frames and sequentially displays the sub frames through time division display, a frame polarity reversing drive method is conventionally used for switching the polarity of a drive voltage for the liquid crystal spatial light modulating element. Examples of such a method are illustrated in FIGS. 2~4 and are described in detail below.

Figure 2:
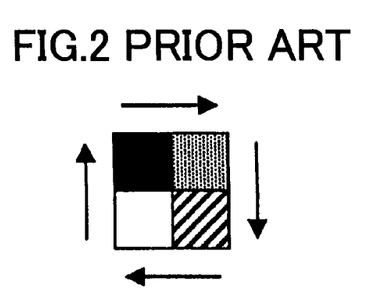
FIG. 2 is a diagram illustrating an example of dividing a frame into four sub frames and displaying the sub frames by a spatial light modulating element.

FIG. 2 illustrates an example of dividing a frame into four sub frames and displaying the sub frames with the spatial light modulating element through time division display while changing the light path with the optical deflecting element so that one pixel of the spatial light modulating element displays four pixels on the display screen. The arrows shown in this drawing represent the pixel shifting direction of a light path shifting unit.

Figure 3:
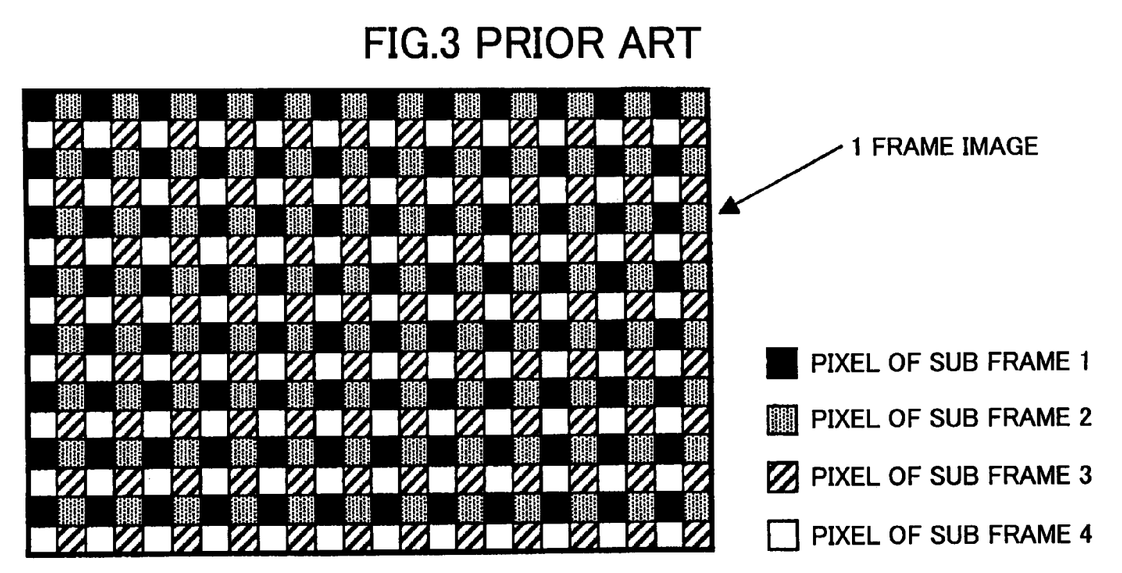
FIG. 3 is a diagram illustrating a frame image that is displayed on a screen in a case where pixels of the spatial light modulating element display the same image of FIG. 2.

FIG. 3 shows a case in which the pixels of the spatial light modulating element displays the same image of FIG. 2 on the screen.

Figure 4:
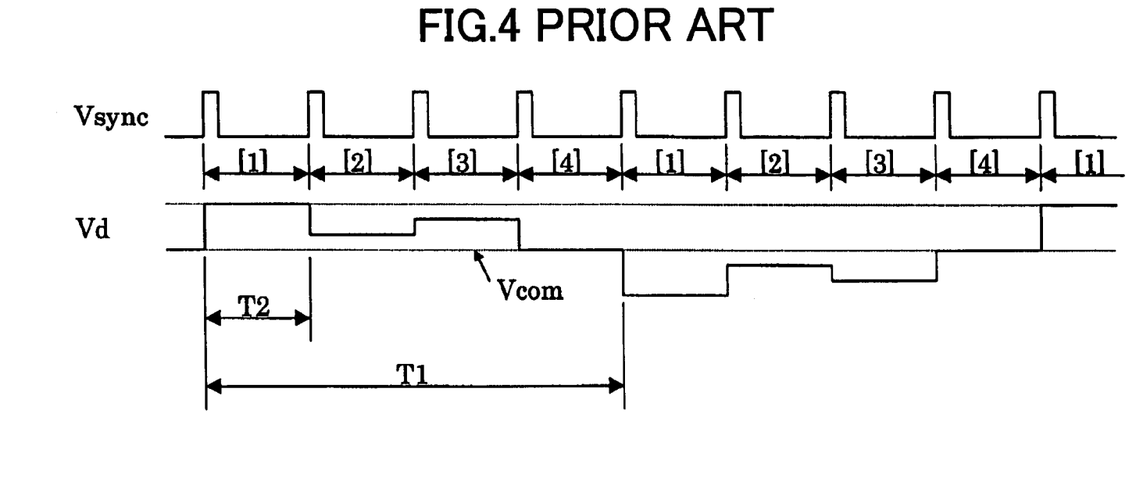
FIG. 4 is a diagram illustrating an exemplary operation of signals for driving the spatial light modulating element.

FIG. 4 illustrates an exemplary operation of signals for driving the spatial light modulating element. In this drawing, Vsync represents a vertical synchronizing signal that is generated in sync with a display period T2 for one sub frame. Vd represents a drive voltage that is applied to a given pixel electrode of the spatial light modulating element. Vcom represents a voltage that is applied to a common electrode. Generally, each pixel is driven by a difference voltage (Vd–Vcom) corresponding to a difference between the drive voltage Vd that is applied to a corresponding pixel electrode and the voltage Vcom that is applied to an opposing electrode corresponding to a common electrode for the pixels that is arranged on the other side of the liquid crystal layer.

It is noted that periods [1] through [4] indicated in this drawing represent the respective sub frame periods making up one frame. As is indicated in the drawing, the polarity of the drive voltage Vd within one period T1 is reversed with respect to the voltage Vcom in a next frame period T1, and in this way, the pixels of the spatial light modulating element may be driven by an alternating current.

However, when a drive method of reversing the polarity for every frame is used, the alternating current drive frequency may be decreased causing a perceptible flicker on the display screen.

Figure 5:
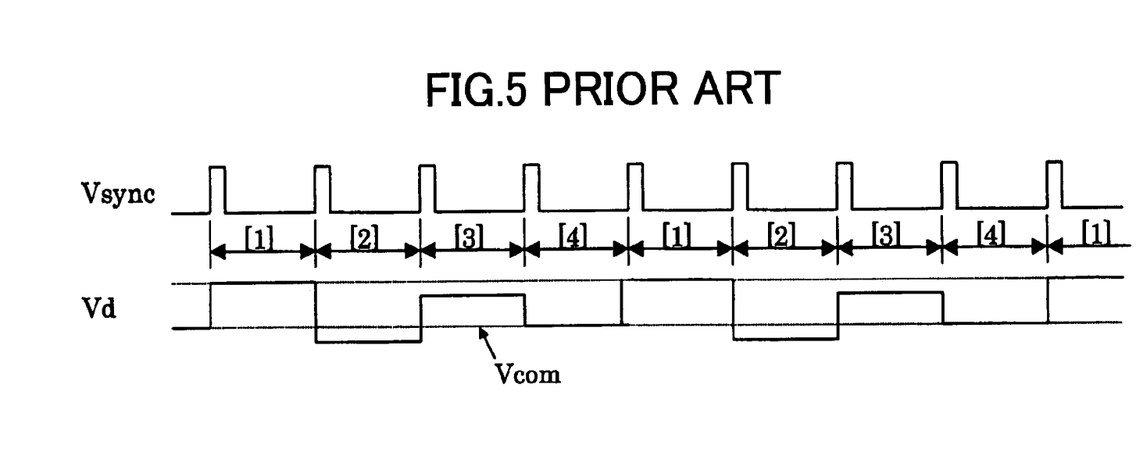
FIG. 5 is a diagram illustrating another exemplary operation of signals for driving the spatial light modulating element in a case where the polarity of a drive signal is reversed for every sub frame.

Accordingly, a method of increasing the alternating current drive frequency to prevent such a flicker effect is known. Japanese Laid-Open Patent Publication No.6-27902 discloses one example of such a method in which the polarity of the drive voltage Vd is reversed for every vertical synchronization period, that is, for every sub frame period. However, in the case of applying such a method to a projector having a light path shifting unit (e.g., optical deflecting element) as is described above, the applied drive current may end up being a direct current, and thereby, the method may not be directly applied. For example, FIG. 5 illustrates the drive voltage Vd of the spatial light modulating element in the case of applying this method to the projector described above. It may be easily understood from this drawing that the drive voltage Vd in this example ends up being a direct current rather than an alternative current.

Japanese Laid-Open Patent Publication No.6-38149 discloses another exemplary method for preventing the flicker effect in which the polarity of the voltage Vd is reversed with respect to every one or more horizontal synchronizing periods and every vertical synchronizing period. However, this method also creates the same problem as is described above.

Figure 6:
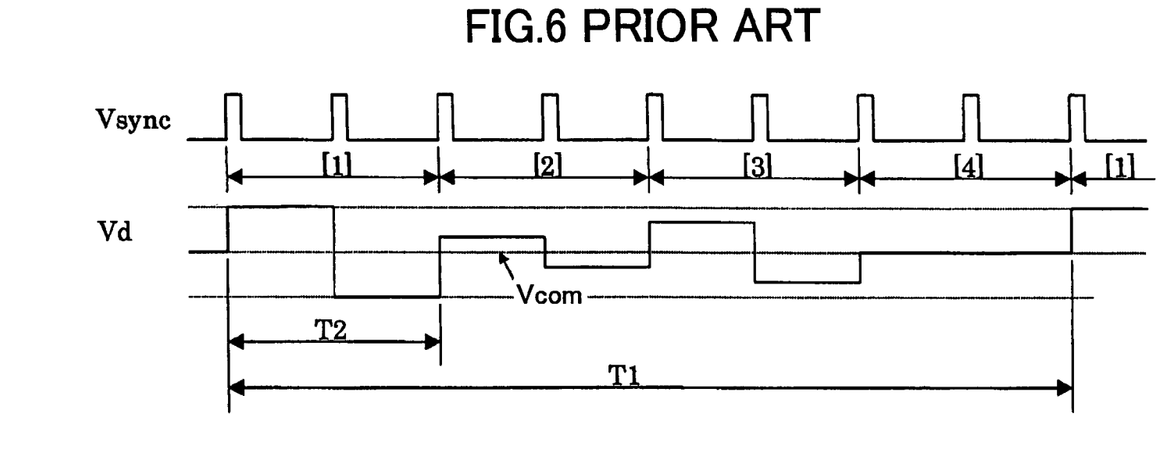
FIG. 6 is a diagram illustrating another exemplary operation of signals for driving the spatial light modulating element in a case where the polarity of a drive signal is reversed for every vertical synchronizing period within a sub frame period.

Japanese Laid-Open Patent Publication No.7-175443 discloses a method of converting the drive voltage into an alternating current by reversing the drive voltage polarity with respect to every vertical synchronizing period within one sub frame period, the method being realized in a case where a sub frame period and a vertical synchronizing period do not correspond and at least two vertical synchronizing periods are provided within one sub frame to realize high speed writing of image data. FIG. 6 corresponds to a diagram illustrating such an arrangement.

Figure 7:
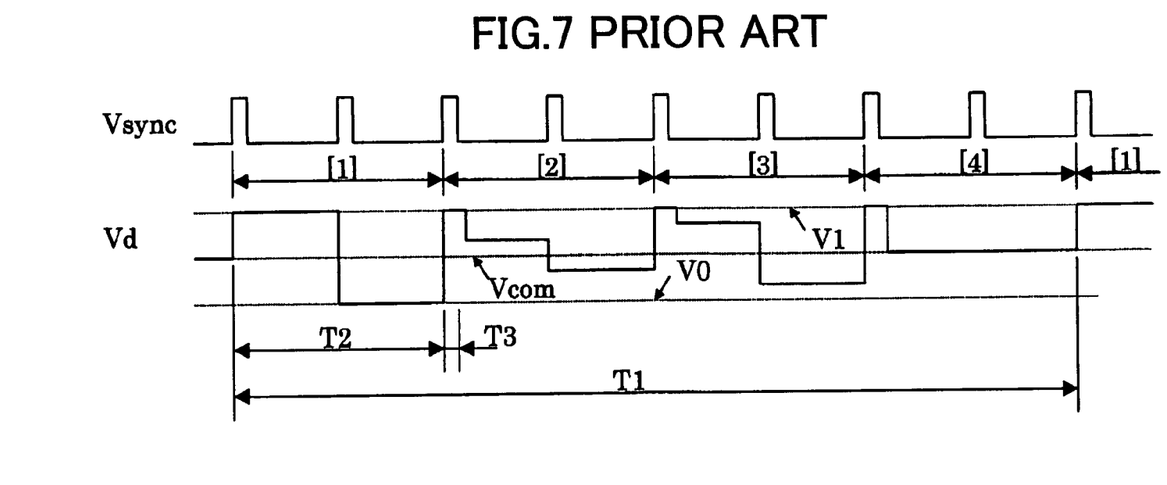
FIG. 7 is a diagram illustrating another exemplary operation of signals for driving the spatial light modulating element in a case where the polarity of a drive signal is reversed for every vertical synchronizing period within a sub frame period and a voltage V1 is applied to the drive signal for a period of T3 when the sub frame display is to be switched.

However, in a display apparatus that is arranged to temporarily display a predetermined gray level (e.g., black display) at the spatial light modulating element upon switching the sub frame display, unless the drive voltage for temporarily displaying the predetermined gray level with the pixels of the spatial light modulating element upon switching the sub frame display corresponds to zero, asymmetry is created between positive and negative voltages so that the applied voltage corresponds to a direct current. FIG. 7 illustrates the problem described above in relation to the arrangement of FIG. 6 in which a voltage V1 is applied for a time period T3 upon switching the sub frame display.

Generally, at a spatial light modulating element, scanned pixel data are written one line at a time owing to restrictions on the amount of using such a spatial light modulating element that is based on a line-sequential system in the image display apparatus that is capable of multiplying the number of displayed pixels by a light path shifting unit, light shifting is conducted simultaneously on all the pixels of the spatial light modulating element, and thereby, a so-called image crosstalk may occur in which the same image may be displayed before and after the light path shifting resulting in the degradation of image quality.

SUMMARY OF THE INVENTION

The present invention has been conceived in response to the one or more problems of the related art and its object is to provide a technique for preventing damage such as burns from being generated in liquid crystal of a spatial light modulating element due to use of a direct current as the drive current in an image display apparatus that is arranged to divide a frame into plural sub frames and sequentially display the sub frames using the liquid crystal spatial light modulating element.

Also, it is another object of the present invention to provide a technique for preventing a direct current from being superposed on a drive voltage by maintaining the drive voltage polarity reversing order to be constant while changing the order in which the sub frames are to be displayed with respect to each frame.

Also, it is an object of the present invention to provide a technique for effectively preventing screen flicker from occurring in an image display apparatus.

Also, it is an object of the present invention to provide a technique for effectively controlling image display particularly in the case of multiplying the number of displayed pixels using a light path shifting unit.

Also, it is an object of the present invention to provide a technique for preventing damage such as burns from being generated in liquid crystal of a spatial light modulating element due to use of a direct current as a drive voltage in an image display apparatus that is arranged to divide a sub frame period into plural vertical synchronizing periods, reverse the drive voltage polarity for a pixel of the spatial light modulating element for every vertical synchronizing period, and temporarily display a predetermined gray level upon switching the sub frame display.

The present invention according to a first aspect provides an image display apparatus that divides a frame into 2i sub frames (i corresponding to a natural number), the apparatus including:

a liquid crystal spatial light modulating element configured to sequentially display the sub frames; and a first alternative current drive unit configured to reverse a polarity of a drive voltage for a pixel of the spatial light modulating element for every j sub frame(s) (j corresponding to a natural number that is less than 2i) and for every n frame(s) (n corresponding to a natural number).

The present invention according to a second aspect provides an image display apparatus that divides a frame into 2i sub frames (i corresponding to a natural number), the apparatus including:

a liquid crystal spatial light modulating element configured to sequentially display the sub frames; and a display control unit configured to reverse a polarity of a drive voltage for a pixel of the spatial light modulating element for every j sub frame(s) (j corresponding to a natural number that is less than 2i) and change a display order of the sub frames for every n frame(s) (n corresponding to a natural number).

According to a preferred embodiment, the image display apparatus of the present invention further includes a second alternative current drive unit configured to reverse the drive voltage polarity for every m horizontal synchronizing period(s) (m corresponding to a natural number).

According to another preferred embodiment, the image display apparatus of the present invention further includes a resetting unit configured to temporarily display the pixel of the spatial light modulating element at a predetermined gray level when the sub frame display is to be switched.

The present invention according to another aspect provides an image display apparatus that divides a frame into 2i sub frames (i corresponding to a natural number), the apparatus including:

a liquid crystal spatial light modulating element configured to sequentially display the sub frames;

a resetting unit configured to temporarily display a pixel of the spatial light modulating element at a predetermined gray level when the sub frame display is to be switched; and an alternative current drive unit configured to divide a display period of each of the sub frames into 2k periods (k corresponding to a natural number) and reverse a polarity of a drive voltage for the pixel for every divided period and for every n frame(s) or sub frame(s) (n corresponding to a natural number).

The present invention according to another aspect provides an image display apparatus that divides a frame into 2i sub frames (i corresponding to a natural number), the apparatus including:

a liquid crystal spatial light modulating element configured to sequentially display the sub frames;

a resetting unit configured to display a pixel of the spatial light modulating element at a predetermined gray level when the sub frame display is to be switched; and a display control unit configured to divide a display period of each of the sub frames into 2k periods (k corresponding to a natural number), reverse the drive voltage polarity for every divided period, and change a display order of the sub frames for every n frame(s) (n corresponding to a natural number).

The present invention according to another aspect provides an alternative current drive method for driving a liquid crystal spatial light modulating element of an image display apparatus that divides a frame into 2i sub frames (i corresponding to a natural number) and sequentially displays the sub frames using the spatial light modulating element, the method including the steps of:

reversing a polarity of a drive voltage for a pixel of the spatial light modulating element, for every j sub frame(s) (j corresponding to a natural number that is less than 2i); and reversing the drive voltage polarity for every n frame(s) (n corresponding to a natural number).

The present invention according to another aspect provides an alternative current drive method for driving a liquid crystal spatial light modulating element of an image display apparatus that divides a frame into 2i sub frames (i corresponding to a natural number) and sequentially displays the sub frames using the spatial light modulating element, the method including the steps of:

reversing a polarity of a drive voltage for a pixel of the spatial light modulating element, for every j sub frame(s) (j corresponding to a natural number that is less than 2i); and changing a display order of the sub frames for every n frame(s) (n corresponding to a natural number).

The present invention according to another aspect provides an alternative current drive method for driving a liquid crystal spatial light modulating element of an image display apparatus that divides a frame into 2i sub frames (i corresponding to a natural number), sequentially displays the sub frames using the spatial light modulating element, and temporarily displays a pixel of the spatial light modulating element at a predetermined gray level when the sub frame display is to be switched, the method including the steps of:

dividing a display period of each of the sub frames into 2k periods (k corresponding to a natural number);

reversing a polarity of a drive voltage for the pixel of the spatial light modulating element for every divided period; and reversing the drive voltage polarity for every n frame(s) or sub frame(s) (n corresponding to a natural number).

The present invention according to another aspect provides an alternative current drive method for driving a liquid crystal spatial light modulating element of an image display apparatus that divides a frame into 2i sub frames (i corresponding to a natural number), sequentially displays the sub frames using the spatial light modulating element, and temporarily displays a pixel of the spatial light modulating element at a predetermined gray level when the sub frame display is to be switched, the method including the steps of:

dividing a display period of each of the sub frames into 2k periods (k corresponding to a natural number);

reversing a polarity of a drive voltage for the pixel of the spatial light modulating element for every divided period; and changing a display order of the sub frames for every n frame(s) (n corresponding to a natural number).

DESCRIPTION OF THE PREFERRED EMBODIMENTS

In the following, preferred embodiments of the present invention are described with reference to the accompanying drawings.

First Embodiment

Figure 8:
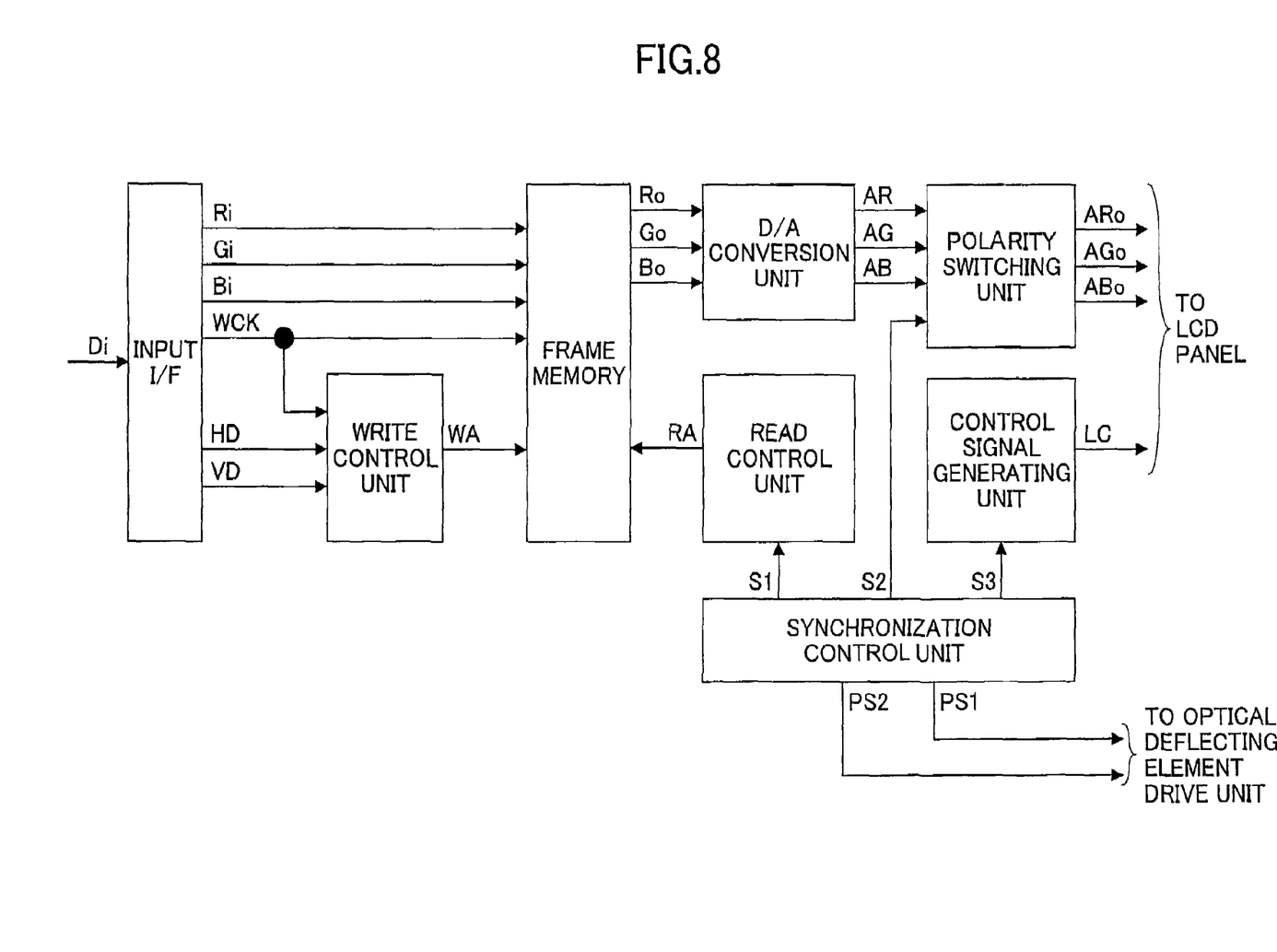
FIG. 8 is a block diagram showing a configuration of an LCD panel drive unit according to an embodiment of the present invention.

FIG. 8 shows a configuration of a panel drive unit that is implemented in an image display apparatus according to an embodiment of the present invention. It is noted that the present embodiment may be applied to the image display apparatus shown in FIG. 1, for example. In the embodiment described below, it is assumed that one frame is divided into four sub frames and the sub frames are sequentially displayed through time division display by a transmissive LCD panel corresponding to a spatial light modulating element.

As is shown in this drawing, image data of one frame Di may be input to an input interface (I/F), the input image data conforming to a standard such as DVI (Digital Video Interface).

In turn, the input I/F decodes the input signal Di to output image data of three primary colors Ri, Gi, and Bi. Also, the input I/F reproduces and outputs a synchronizing clock WCK, and outputs horizontal and vertical synchronizing signals HD and VD corresponding to the input image.

A write control unit is arranged to determine the number of scanning lines by counting the horizontal synchronizing signal pulse number within a vertical synchronizing period and determine the number of valid pixels within a horizontal synchronizing period based on the synchronizing clock WCK to determine the size of the original image input to the apparatus. Then, the write control unit generates and outputs a write control signal WA for controlling writing of the image data Ri, Gi, and Bi to a frame memory. The write control signal WA includes a write address, which is made up of a horizontal direction address part corresponding to the main scanning direction address, and a vertical direction address part corresponding to the sub scanning direction address.

The frame memory sequentially writes the image data Ri, Gi, and Bi according to the control signal WA and in synch with the synchronizing clock WCK. It is noted that as the frame memory, a memory having a dual port function is preferably used for enabling reading of the image data by a read address RA that is asynchronous with the writing of the image data.

A read control unit is arranged to generate a read address RA for reading image data stored in the frame memory based on a control signal S1 output from a synchronization control unit. In this case, data corresponding to a sub frame that is to be displayed are sequentially read out.

The frame memory reads image data Ro, Go, and Bo according to the read address RA and outputs the image data to a D/A conversion unit.

The D/A conversion unit converts the image data Ro, Go, and Bo input from the frame memory into voltage signals AR, AG, and AB, and outputs the voltage signals to a polarity switching unit.

The polarity switching unit is arranged to convert the analog image data AR, AG, and AB input from the D/A conversion unit into voltage signals through level conversion with respect to a common voltage Vcom and switch the polarity (positive/negative) of the voltage signals with respect to the common voltage Vcom based on a control signal S2 from the synchronizing control unit to output signals ARo, AGo, and ABo.

A control signal generating unit is arranged to generate a signal LC for controlling the display of the transmissive LCD panel based on a control signal S3 from the synchronizing control unit. It is noted that the signal LC includes a vertical synchronizing signal Vsync and the common voltage Vcom.

The synchronizing control unit is arranged to generate the control signals S1~S3 for the read control unit, the polarity switching unit, and the control signal generating unit, respectively, as described above. The synchronizing control signal is also generates signals PS1 and PS2 for controlling driving of the optical deflecting element, and outputs these signals to the optical deflecting element drive unit.

It is noted that according to the embodiment described below, when the signal PS1 corresponds to 'H' and the signal PS2 corresponds to 'L' for a given pixel of the LCD panel, the optical deflecting element is driven to display the corresponding image at the position for sub frame 1 shown in FIGS. 2 and 3. Similarly, when the signal PS1 corresponds to 'H' and the signal PS2 corresponds to 'H', the optical deflecting element is driven to display the corresponding image at the position for sub frame 2. When the signal PS1 corresponds to 'L' and the signal PS2 corresponds to 'H', the optical deflecting element is driven to display the corresponding image at the position for sub frame 3, and when the signal PS1 corresponds to 'L' and the signal PS2 corresponds to 'L', the optical deflecting element is driven to display the corresponding image at the position for sub frame 4. However, the present invention is not limited to such an embodiment.

Figure 9:
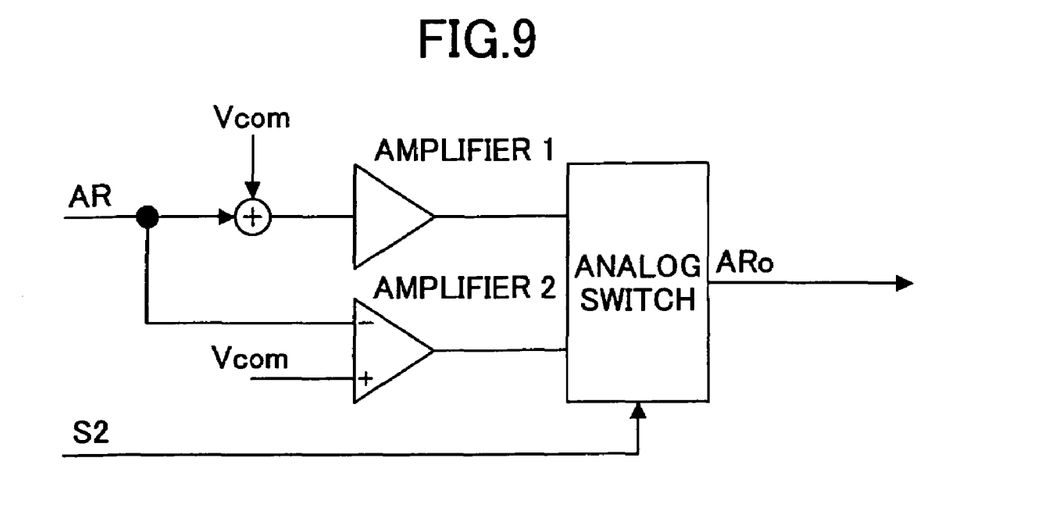
FIG. 9 is a block diagram showing a configuration of a polarity switching unit according to an embodiment of the present invention.

FIG. 9 shows a configuration of the polarity switching unit according to an embodiment of the present invention. It is noted that in this illustrated example, image data AR are input and processed at the polarity switching unit, however, the image data AG and AB may also be processed in the same manner.

According to the present example, an amplifier 1 receives the image data AR from the D/A conversion unit along with the common voltage Vcom added thereto. Accordingly, an image data signal with a positive polarity with respect to the common voltage Vcom is output. On the other hand, amplifier 2 corresponds to a differential amplifier at which the image data AR are supplied as a negative input and the common voltage Vcom is supplied as a positive input. Accordingly, an image data signal with a negative polarity with respect to the common voltage Vcom is output from the amplifier 2.

An analog switch is controlled by the control signal S2, and is arranged to selectively output one of either an output from the amplifier 1 or an output from the amplifier 2 and transmit the selected output to the LCD panel.

It is noted that in the embodiment described below, when the control signal S2 corresponds to 'H', image data with a positive polarity is output, and when the control signal S2 corresponds to 'L', image data with a negative polarity is output. However, the present invention is not limited to this embodiment, and for example, the corresponding relation between the control signal levels H/L and the positive/negative polarity outputs may be reversed. Also, it is noted that in this embodiment, the polarity of the drive voltage within a vertical synchronizing period is arranged to be constant; however, the control signal S2 may be switched at each horizontal synchronizing period, for example.

Figure 10:
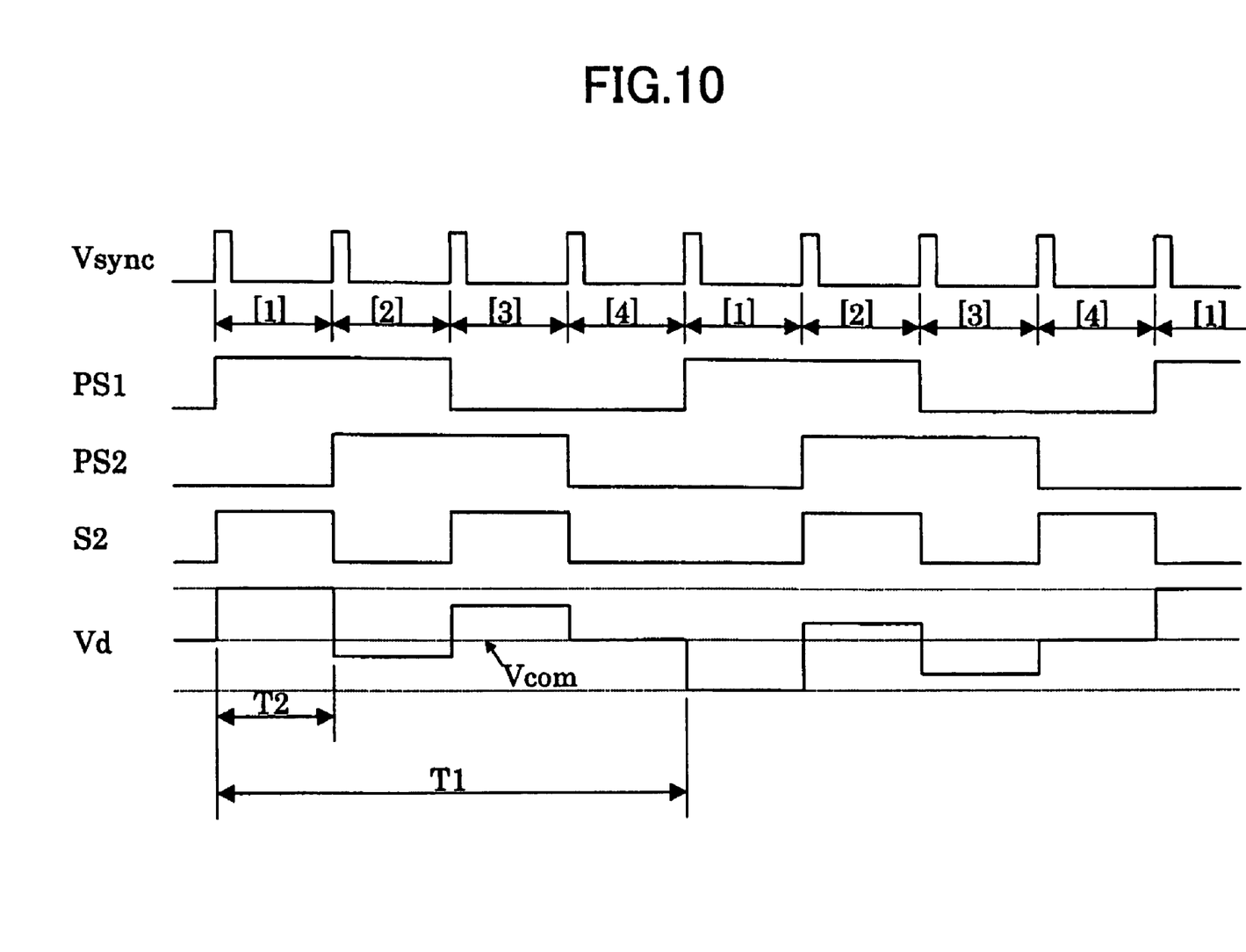
FIG. 10 is a diagram illustrating an exemplary operation of signals according to a first embodiment of the present invention.

FIG. 10 is a diagram illustrating an exemplary operation of signals according an embodiment of the present invention. According to this example, the sub frames are displayed according to a predetermined order such as [1], [2], [3], [4] . . . , and the polarity of the drive voltage Vd for a pixel is reversed with respect to the common voltage Vcom for every sub frame as well as for every frame. In this way, the optical deflecting element may be driven by an alternative current so that flicker may be avoided and a good image display quality may be achieved.

Second Embodiment

Figure 11:
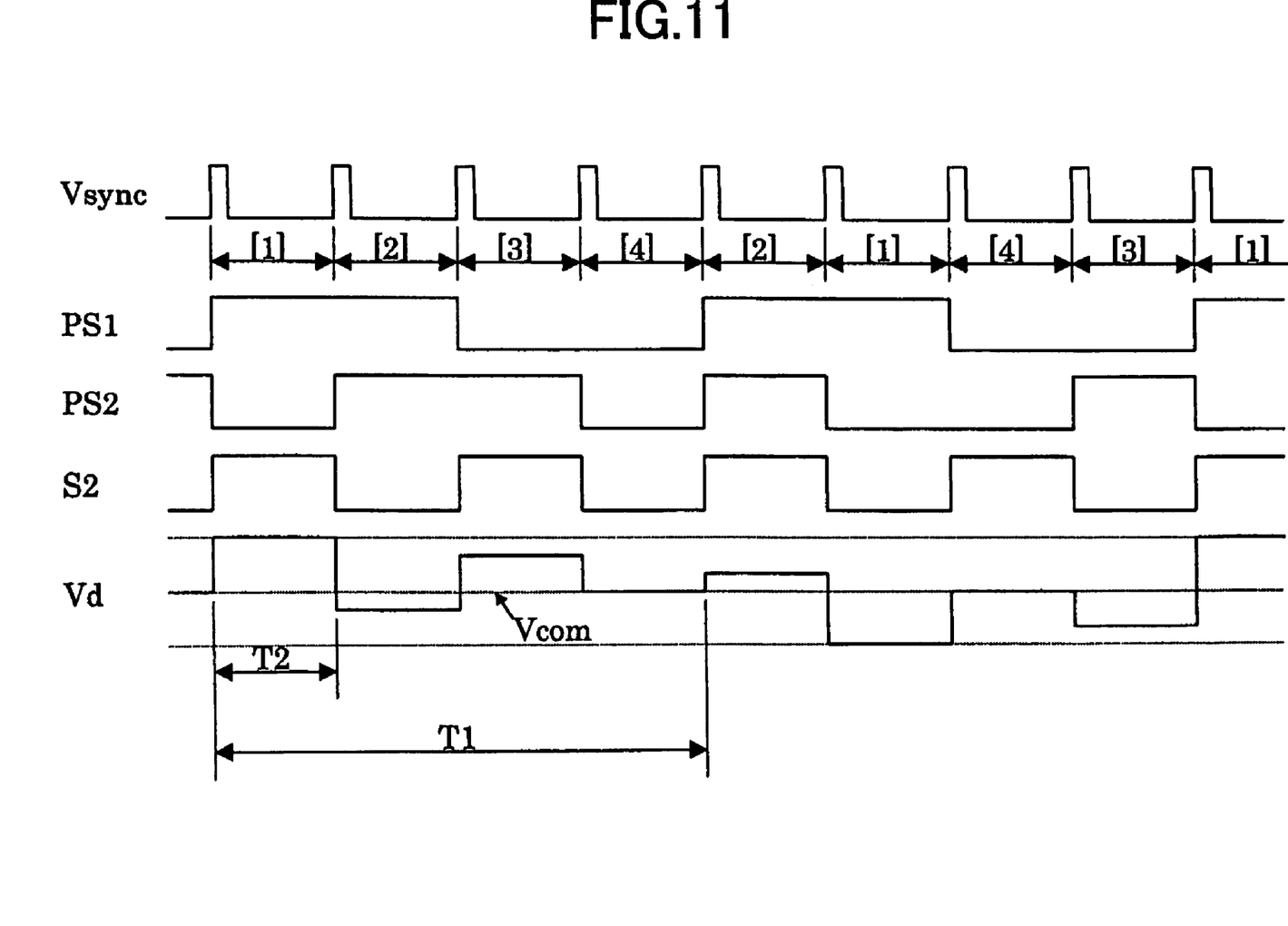
FIG. 11 is a diagram illustrating another exemplary operation of signals according to a second embodiment of the present invention.

FIG. 11 shows another exemplary operation of signals according to an embodiment of the present invention. In the present example, the polarity of the drive voltage Vd is switched for every sub frame according to a predetermined cycle, and the respective sub frames within the frames are read alternatingly in the order of [1], [2], [3], [4] and [2], [1], [4], [3]. In this way, the optical deflecting element may be driven by an alternative current so that flicker may be avoided and a good image display quality may be achieved.

Third Embodiment

Figure 12:
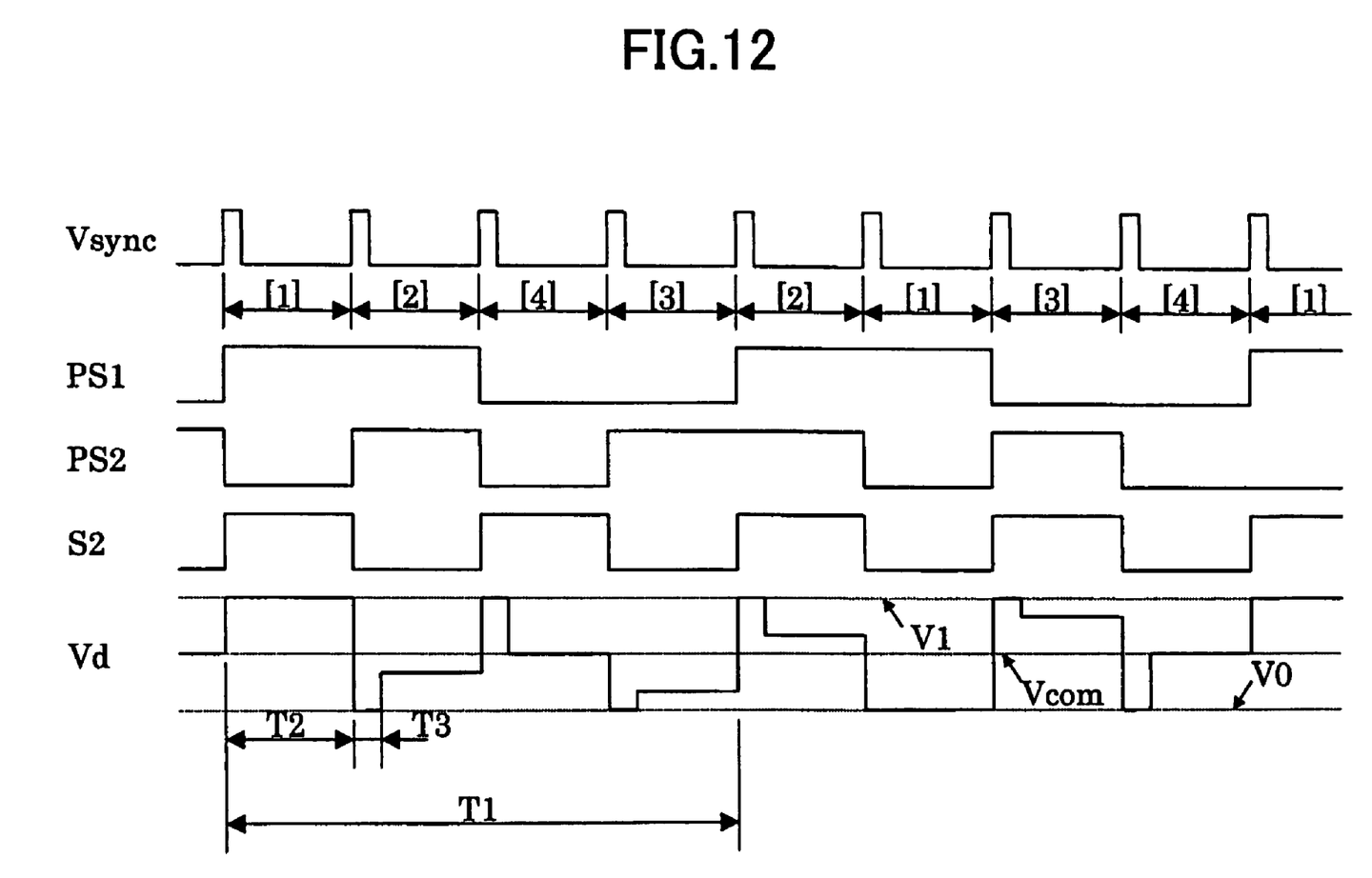
FIG. 12 is a diagram illustrating another exemplary operation of signals according to a third embodiment of the present invention.

FIG. 12 illustrates another exemplary operation of signals according to an embodiment of the present invention. In this example, the polarity of the drive voltage Vd is switched for every sub frame according to a predetermined cycle as is the case for the second embodiment; however, in contrast to the second embodiment, the reading order of the sub frames within the frames is alternatingly switched between [1], [2], [4], [3] and [2], [1], [3], [4]. Also, according to this example, upon switching the display of sub frames, the drive voltage is set to V1 or V0 so that pixels may temporarily be displayed at a predetermined gray level such as black. In this way, the optical deflecting element may be driven by an alternative current so that flicker may be avoided and a good image display quality may be achieved. In addition, the generation of the so-called image crosstalk in which the same image is displayed before and after pixel shifting may be prevented, and an even higher quality display image may be obtained.

Fourth Embodiment

Figure 13:
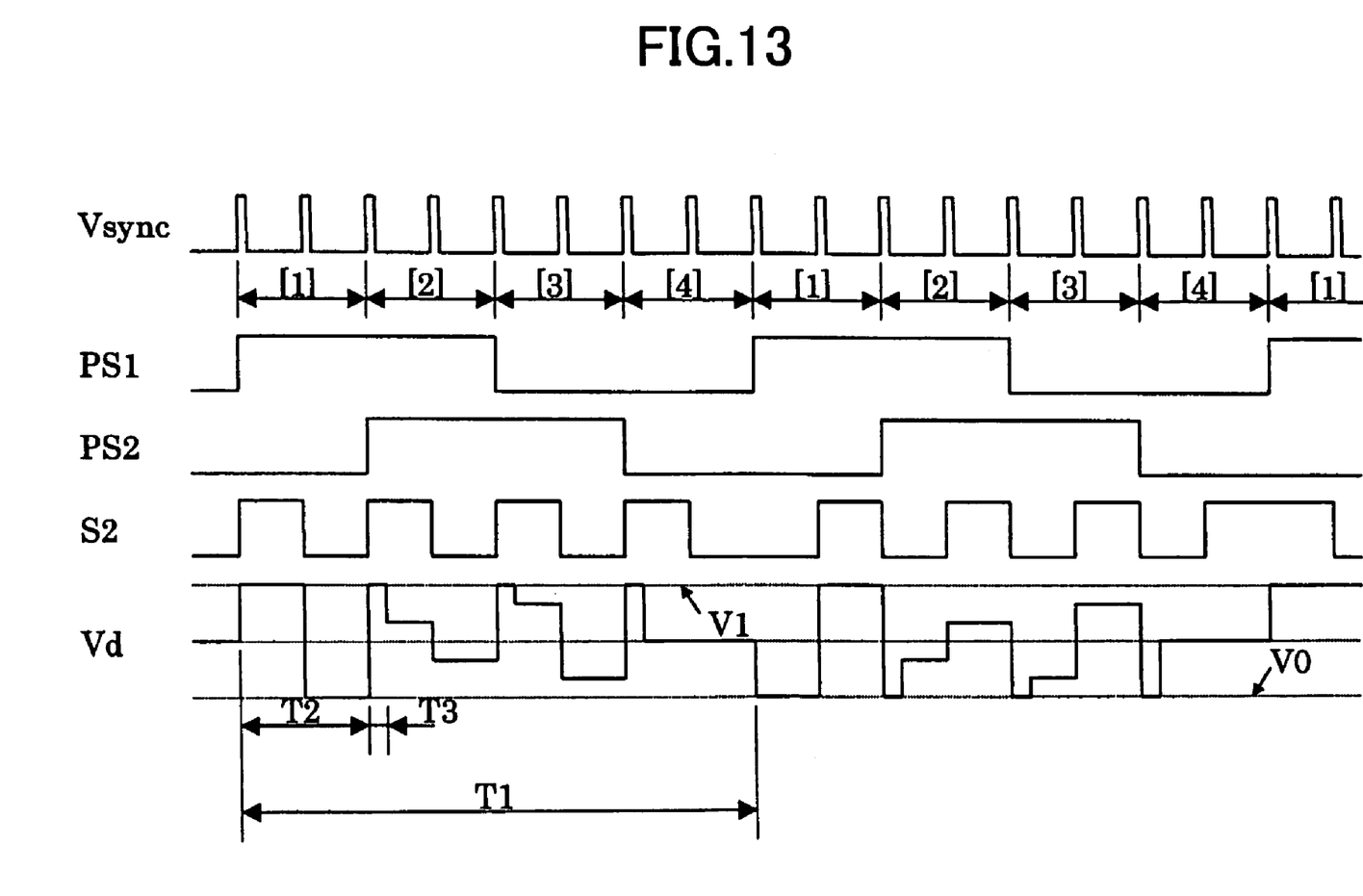
FIG. 13 is a diagram illustrating another exemplary operation of signals according to a fourth embodiment of the present invention.

FIG. 13 illustrates another exemplary operation of signals according to an embodiment of the present invention. In the present example, one sub frame period is arranged to be made up of two vertical synchronizing periods and the polarity of the drive voltage Vd for a pixel is arranged to be reversed for every vertical synchronizing period as well as for every frame period.

It is noted that in the present example, the polarity reversing order within a sub frame period is switched for every frame; however, in another embodiment, the polarity reversing order within a sub frame period may be kept constant and the display order of the sub frames may be switched for every frame.

Further, the present invention is not limited to the specific embodiments described above, and variations and modifications may be made without departing from the scope of the present invention.

The present application is based on and claims the benefit of the earlier filing date of Japanese Patent Application No.2004-025175 filed on Feb. 2, 2004, the entire contents of which are hereby incorporated by reference.

What is claimed is:

1. An alternative current drive method for driving a liquid crystal spatial light modulating element of an image display apparatus that divides a frame into four sub frames in a plane, sequentially displays the sub frames using the spatial light modulating element, and temporarily displays a pixel of the spatial light modulating element at a predetermined gray level when the sub frame is to be switched, the method comprising:
  dividing a display period of each of the sub frames into periods;
  reversing a polarity of a drive voltage for the pixel of the spatial light modulating element for every divided period;
  performing a time divisional display such that a single pixel is used to display the four sub frames of a frame using the liquid crystal light modulating element and an optical deflecting element being driven to display the corresponding image at four display positions in sync with each sub frame, the four display positions being arranged in a two-by-two matrix having two rows and two columns and corresponding to the four sub frames on a one-to-one basis; and
  changing a display order of the sub frames for every frame, wherein the driving of the optical deflecting element is performed such that a direction of shifting of the single pixel to the four display positions differs from frame to frame.

* * * * *